United States Patent [19]

Mahyera et al.

[11] Patent Number: 4,484,643

[45] Date of Patent: Nov. 27, 1984

[54] GAS-LIQUID-SOLIDS SEPARATION SYSTEM

[75] Inventors: Anil Mahyera; Carel J. H. Brest Van Kempen, both of Salt Lake City; Robert M. Sweet, Riverton; Amber C. Davidson, Salt Lake City, all of Utah

[73] Assignee: Methane Drainage Ventures, Placentia, Calif.

[21] Appl. No.: 507,862

[22] Filed: Jun. 27, 1983

[51] Int. Cl.³ .............................................. E21B 21/06
[52] U.S. Cl. ................................... 175/206; 175/210; 210/539; 55/219; 55/342
[58] Field of Search .................... 175/206, 66, 209–211, 175/217, 219, 308; 166/65 R; 173/28; 210/533, 539, 86, 123; 55/219, 308, 342, 432, 446

[56] References Cited

U.S. PATENT DOCUMENTS

| | | | |
|---|---|---|---|
| 1,400,962 | 12/1921 | Leonard | 175/217 |
| 2,941,783 | 6/1960 | Stinson | 175/210 |
| 3,268,017 | 8/1966 | Yarbrough | 175/210 |
| 3,417,830 | 12/1968 | Nichols | 175/209 |
| 3,842,461 | 10/1974 | Wurster | 55/342 X |
| 4,250,974 | 2/1981 | Heilhecker et al. | 175/206 X |
| 4,355,652 | 10/1982 | Perkins | 55/219 |

Primary Examiner—James A. Leppink
Assistant Examiner—Thuy M. Bui
Attorney, Agent, or Firm—Fowler, Lambert & Hackler

[57] ABSTRACT

A gas-liquid-solids separation system for use with a drilling device includes a surge tank for holding drilling efflux comprising gas, liquid and solids, and adapted for mounting on a drilling device in a position for having a drill shaft extending therethrough. A stuffing box attached to a back side of the surge tank means and configured for enabling passage of the drill shaft therethrough prevents the drilling efflux from escaping the surge tank. A flange attached to the front side of the surge tank and aligned with the stuffing box for allowing passage of the drill shaft therethrough provides a seal between the surge tank and a borehole casing to enable the drilling efflux to flow into the surge tank means. An agitator disposed within the surge tank maintains suspension of the solids within the liquid, and a gas cyclone in fluid communication with the surge tank withdraws gas from the surge tank and separates any entrained liquid therefrom. The liquid and solids suspended therein are transferred to a slurry cyclone for separation and thereafter the liquid is stored in a tank for subsequent reuse as a cutting fluid.

10 Claims, 5 Drawing Figures

GAS-LIQUID-SOLIDS SEPARATION SYSTEM

The present invention is generally related to a gas-liquid-solids separation system, and more particularly is directed to a separation system for use with a drilling device for separating gas and drill cuttings from drilling fluid.

Collection of gas from subterranean formations, such as methane gas from coal seams, may involve the drilling of long, generally horizontal holes within the coal seams. During the drilling operation, methane gas is released as the drilling fluid flushes cuttings from the hole. It is well known that methane gas presents a significant hazard in mining apparatus. In conventional mining operations, air dilution may be used to prevent the methane level within the mine from exceeding 1% in order to prevent a combustive mixture from forming.

However, the drilling of an extensive number of horizontal holes within coal seams in order to either drain the coal seams of methane before subsequent mining thereof, or for the commercial collection of methane gas, releases a significant amount of methane gas. Preferably, this gas should be collected for commercial sale or for onsite use.

Conventional separators for gases and liquids in the form of a baffled box, or the like, tend to be very large and not amenable to underground installation because of the limited work areas available at drilling sites. Drilling devices suitable for boring long holes in coal seams generally include a drill head which is supported by a long, hollow shaft through which cutting fluid is passed from the driven end of the shaft to the remotely located drill head. The cutting fluid enables more efficient cutting of the drill head, and further acts to flush the drill cuttings back along the borehole, and typically within a casing, to the hole entrance. Methane gas released from the coal is entrapped by the liquid and flushed out of the borehole by the cutting fluid.

Typically, a stuffing box is utilized in conjunction with the drill shaft to prevent passage of the cutting fluid into the motor and driving portions of the drilling device.

The present invention is directed to a compact and portable system for use with a drilling device for receiving drilling efflux, which includes the cutting fluid, cuttings and gas, directly from the borehole casing. The system separates the methane gas and the drill cuttings for collection and recirculates the cutting fluid back to the drilling device.

SUMMARY OF THE INVENTION

In accordance with the present invention, a gas-liquid-solids separation system for use with a drilling device includes: surge tank means for holding drilling efflux comprising gas, liquid and solids; a stuffing box; flange means; gas cyclone means; slurry pump means; slurry cyclone means; and tank means.

The surge tank is adapted for mounting on the drilling device in a position for having a drill shaft extending therethrough. The stuffing box is attached to a back side of the surge tank and configured for enabling passage of the drill shaft therethrough and includes means for preventing drilling efflux to pass therethrough.

To enable the surge tank to be mounted and sealed to a borehole casing, the provided flange means are attached to a front side of the surge tank means and aligned with the stuffing box for allowing passage of the drill shaft therethrough. Gas is separated by the gas cyclone means which is in fluid communication therewith at a position above the liquids and solids portion of the drilling efflux within the surge tank means.

The slurry pump and the slurry cyclone means are in fluid communication with the surge tank for withdrawing liquid and suspended solids therefrom and separating the solids from the liquids, and the tank means includes a pump for withdrawing liquid from the slurry cyclone, storing the liquid and supplying the liquid to the drilling device for use as a cutting fluid.

More particularly, the present invention includes agitator means disposed, in part, in the surge tank means for causing and maintaining suspension of the solids in the liquids. The agitator means includes the slurry pump which is disposed outside the surge tank means and interconnected therewith by a conduit system. Float means are provided within the surge tank means for maintaining the amount of drilling efflux in the surge tank within a preselected range; and control means, interconnected with the float means and the conduit system, is provided for withdrawing of water and cuttings from the surge tank with the slurry pump and transferring the water and cuttings to the slurry cyclone means in response to control signals from the float means.

BRIEF DESCRIPTION OF THE DRAWINGS

The advantages and features of the present invention will appear from the following description considered in conjunction with the accompanying drawings in which.

DETAILED DESCRIPTION

Figure 1:
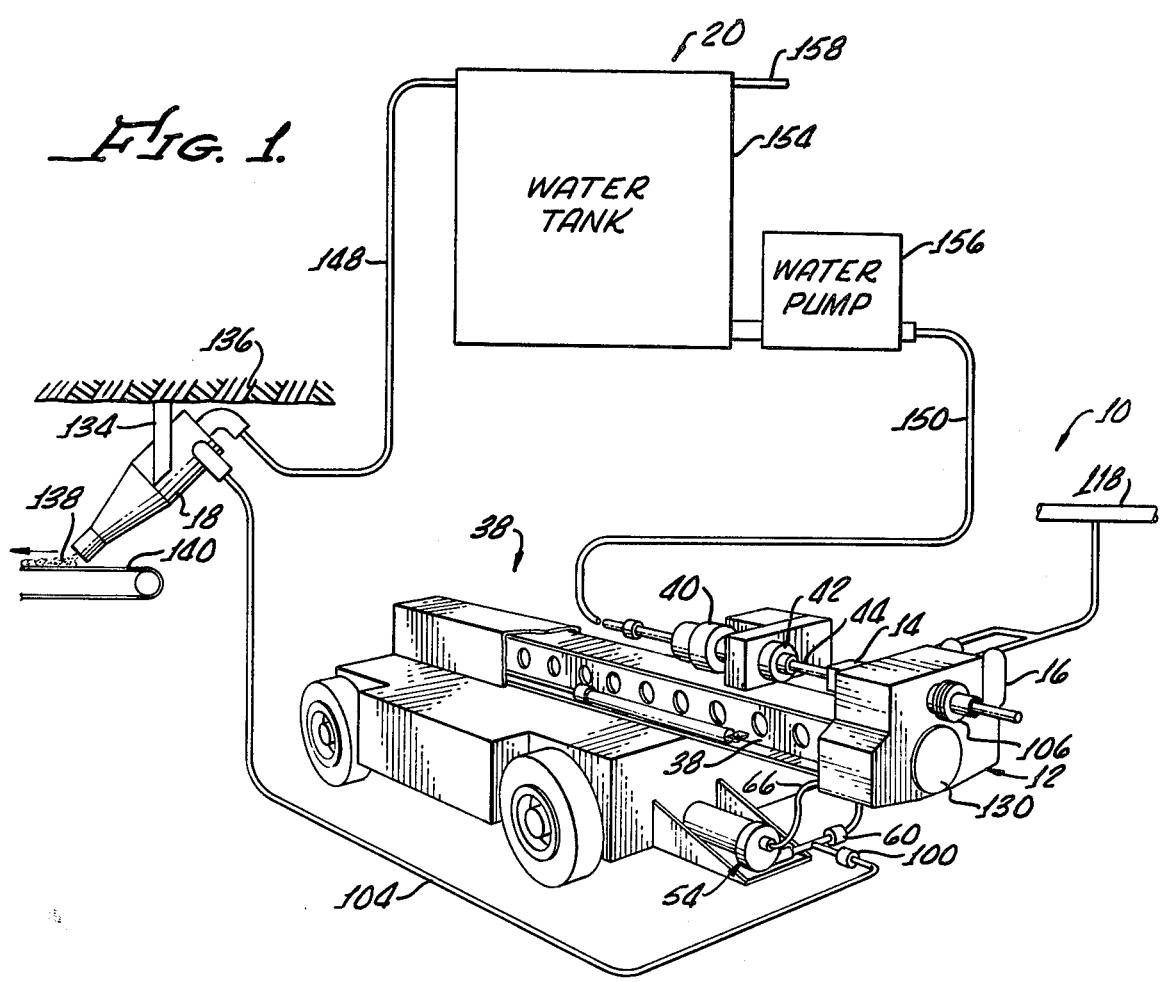
FIG. 1 is an overall drawing of a system in accordance with the present invention, partly in perspective, generally showing the surge tank means attached to a drilling device, and interconnected with a slurry pump, a slurry cyclone and a water pump. Gas cyclones are attached directly to the surge tank and are interconnected with a pipeline for transmitting methane gas to the earth's surface.

Turning now to FIG. 1, there is shown a gas-liquid-solids separation system 10 in accordance with the present invention which generally includes a surge tank 12, a stuffing box 14, gas cyclones 16, a slurry pump 54, a slurry cyclone 18, a tank 20, and a water pump 156.

Figure 4:
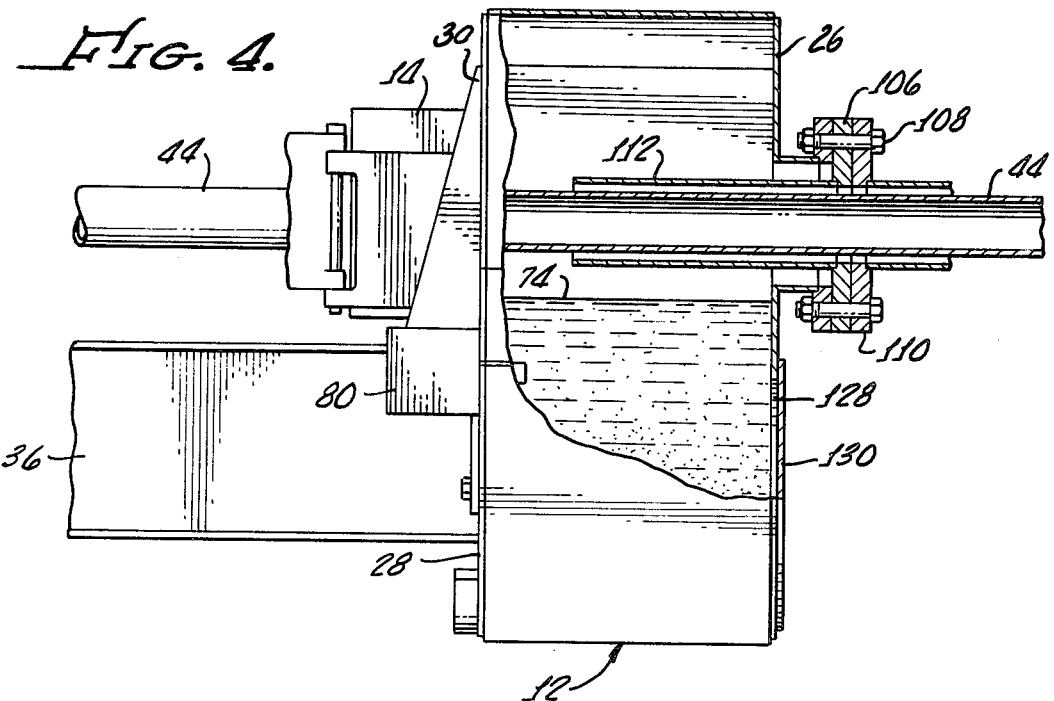
FIG. 4 is a side view of the surge tank means, partially broken away, showing the surge tank in an operative relationship with a drill pipe.
Figure 3:
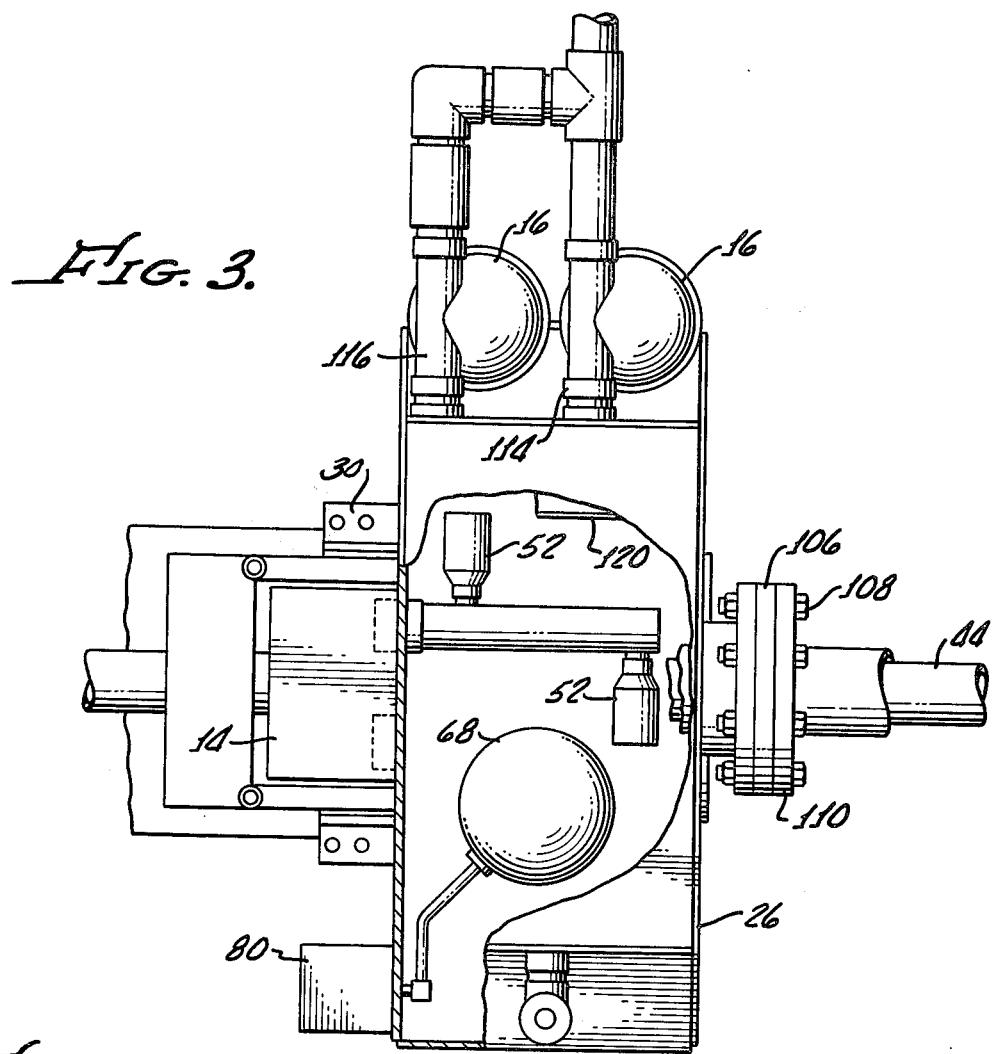
FIG. 3 is a top view of the surge tank means, partially broken away to show the float means and part of the slurry agitator therein.
Figure 2:
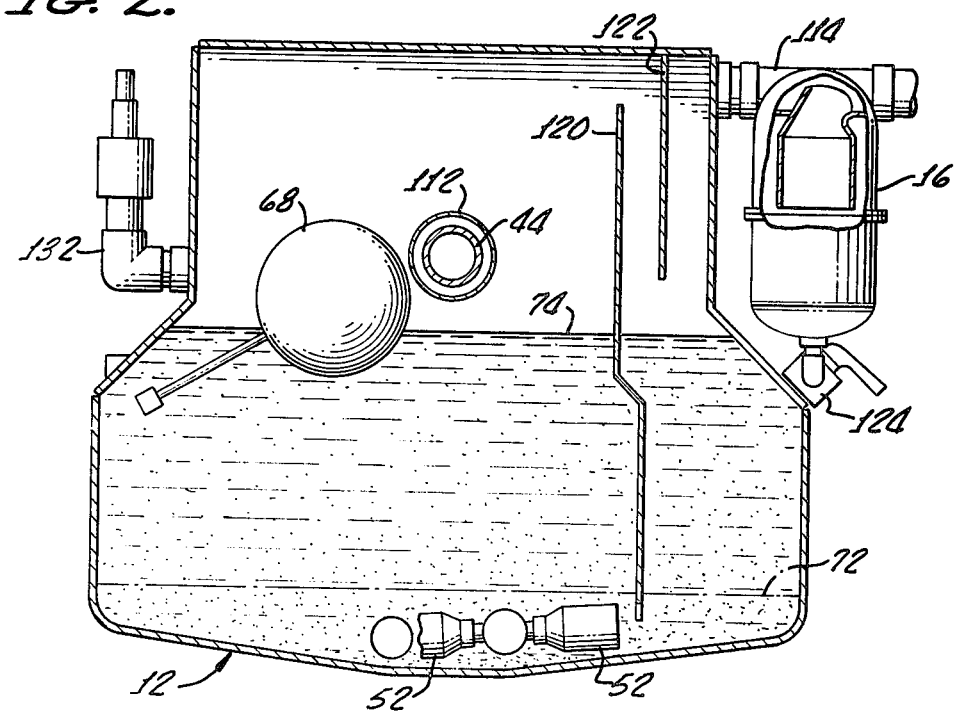
FIG. 2 is a cross-section view of the surge tank means showing baffles, part of the agitator means therein and float means for maintaining the level of efflux in the surge tank means.

More particularly, as shown in FIGS. 2, 3 and 4, the surge tank is generally rectangular and includes a front face 26 and a rear face 28, having a flange 30 thereon for adapting the surge tank for mounting on the drill mast 36 of a drilling device 38.

Not being part of the present invention, the drilling device 38 includes a drill motor 40 slidably mounted on the drill mast, and a drill pipe clamp 42 for grasping drill pipe 44. In operation, the drill motor 40 is slid back and forth along the mast when adding or removing sections of drill pipe as the drilling operation continues.

As shown in FIGS. 1, 3 and 4, the surge tank is mounted in a position for having the drill pipe, or shaft, 44 extending therethrough and provides a means for holding drilling efflux which includes the cutting fluid, water, drill cuttings and methane gas.

Figure 5:
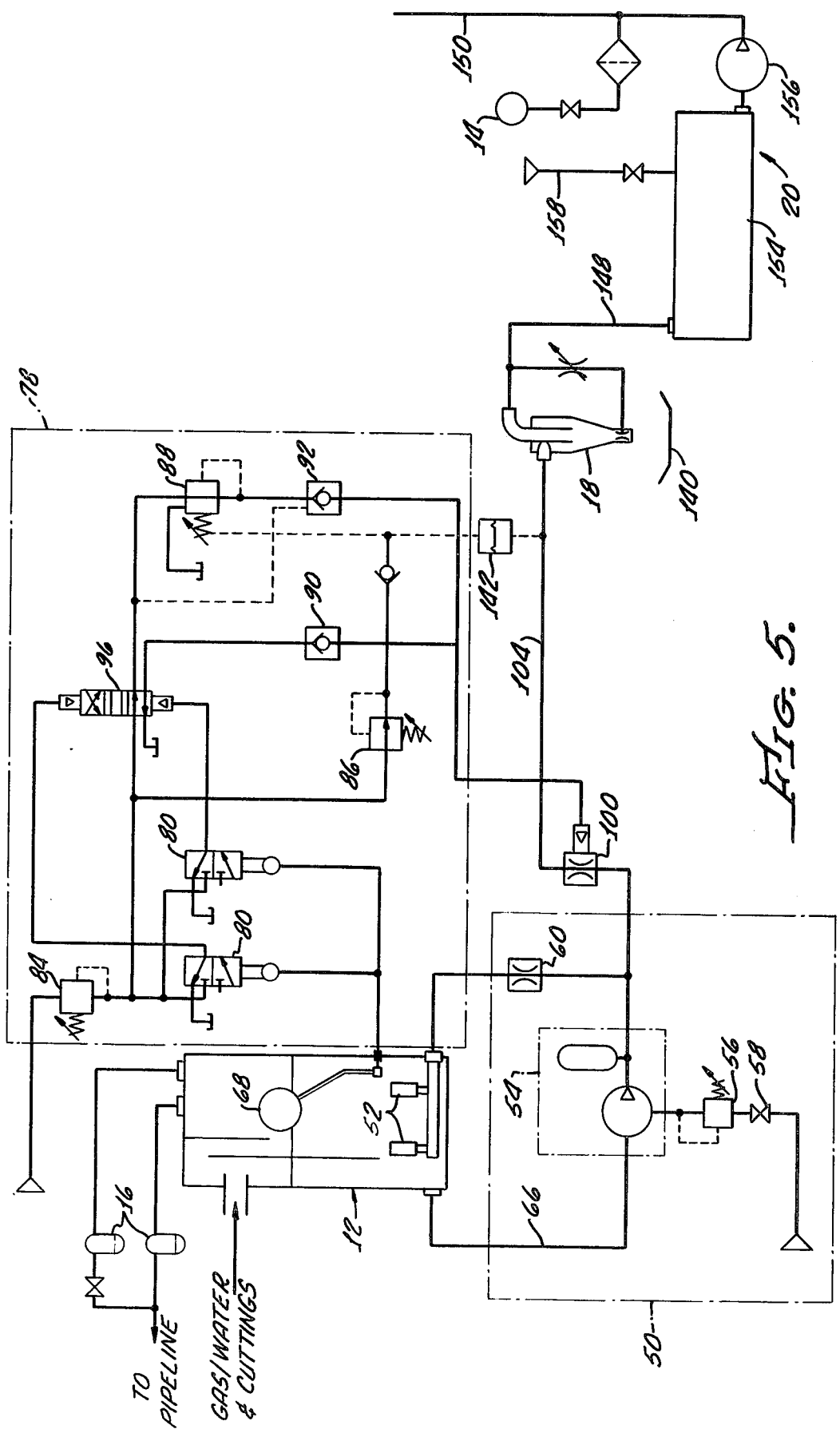
FIG. 5 is a schematic drawing of the gas-liquid-solids separation system in accordance with the present invention.

Agitator means 50, see FIG. 5, including eductors 52 disposed within the surge tank 12, are provided for causing and maintainilng suspension of drill cuttings in the water within the surge tank 12. The agitator means 50 includes a slurry pump 54 which may be driven by mine air through a pressure regulator 56 and a valve 58. The slurry pump 54 is preferably disposed outside of the slurry tank to provide easy maintenance thereof and is interconnected through a fixed orifice slurry valve 60 by conduit system 66 with the eductors 52. Operation of the agitator means in conjunction with other components of the system will be hereinafter discussed in greater detail.

Turning to FIG. 3 as well as FIG. 5, the gas-liquid-solids separation system further includes a float 68, disposed within the surge tank means 12, which provides a means for maintaining the amount of drilling efflux in the surge tank within a preselected range, a slurry low level and a slurry high level being indicated as dashed lines 72, 74 in FIG. 2.

The float 68 is interconnected with a control system, or means, 78, see FIG. 5, for enabling water and cuttings to be withdrawn from the surge tank 12 and transferred to the slurry cyclone 18 in response to control signals from the float 68.

The control system 78 may be hydraulic for mine safety considerations, and operates in a conventional manner utilizing float limit switches 80, pressure reducers 84, 86, a regulator 88, directional flow valves 90, 92, and a control valve 96 to control the amount of slurry flowing through a variable orifice slurry valve 100 interconnected between the conduit system 66, the slurry pump 54 and the slurry cyclone 18.

In operation, the slurry pump 54 causes agitation of the slurry within the tank 12 by pumping the slurry continuously through the conduit system 66 and through the eductors. When the float 68 reaches the preselected level 74, the control system 78 operates to open the variable orifice slurry valve 100 to remove a portion of the slurry within the slurry tank 12 via the conduit system 66 and into the slurry cyclone by means of a conduit 104.

As slurry is removed from the surge tank 12, the float is lowered, and when it reaches the preselected flow level of slurry 72 within the surge tank the variable orifice slurry valve 100 is closed by the control system 78. It should be appreciated that the control system is preferably disposed entirely outside of the surge tank for easy maintenance, and that the preselected high and low levels of slurry within the tank may be adjusted without entry into the surge tank 12.

Turning again to FIGS. 2, 3 and 4, the stuffing box 14 is attached to the rear, or back, 28 side of the surge tank 12 and is configured for enabling passage of the drill pipe 44 therethrough and includes means such as conventional seals or the like, not shown, for preventing drilling efflux to pass therethrough. In this manner, all of the gas, liquids and solids removed from the borehole are collected within the surge tank 12. A flange 106 is attached to the front 26 of the surge tank 12 and aligned with the stuffing box 14 for allowing passage of the drill pipe, or shaft, 44 therethrough. The flange 106 is configured utilizing bolts 108 or the like for mounting and sealing the surge tank to a borehole casing flange 110 and includes pipe means 112 terminating within the surge tank means for surrounding the drill pipe 44 and enabling drilling efflux within the borehole to flow into the surge tank means. The surge tank 12 thereby provides a seal between the borehole and the drilling device 38 for collecting drilling efflux, while preventing methane gas, cutting fluid and cuttings from entering the working area of a mine or shaft.

The gas cyclones 16 are attached to the surge tank 12 and are in fluid communication therewith by means of conduits 114, 116 (See FIG. 3) at a position above the liquid and solids portion of the drilling efflux indicated by the slurry high level line 74. Methane gas separted from the drilling efflux by the gas cyclones 16 is passed to a pipe 118 (See FIG. 3) for conveyance out of the mining area. The gas cyclones, which may be of any suitable commercially available type, may be separated from the pipe 112 by means of baffles 120, 122 in order that liquids pouring from the pipe 112 do not splash or spray directly into the gas cyclones 16.

To clean the methane gas from the surge tank and at gas flow rates up to one-half a design limit, only one cyclone may be operated. At higher flow rates, the second cylone may be operated to insure maximum efficiency and separation of entrained water and any fine cuttings that may enter the cyclone. A drain 124 is provided, which may be manually or automatically operated, to remove the separated liquids and solids from the gas cyclones 16.

A port 128, which is sealed by a cover 130, provides an access to the eductors 52 and the bottom of the slurry tank 12 in order to periodically clean the large pieces of cuttings which are unable to pass through the agitator means 50. Additionally, a screen, not shown, may be provided to separate such large particles from contact with the eductors 52, such a screen being sized to enable passage of typical sized cuttings. In addition, a relief valve 132 may also be provided to prevent damage to the surge tank in the event of excessive pressure buildup therein.

As hereinabove noted, the slurry cyclone 18, which may be of any suitable commercially available type, is in fluid communication with the slurry pump 54 and the receiving surge tank 12 for water and suspended cuttings therefrom and separating the cuttings from the water. It is preferable to use a slurry cyclone constructed of urethane to facilitate handling thereof and be operable at 30 to 50 degrees off the horizontal to minimize head room requirements, especially in a low coal seam operation.

In order to elevate the cyclone and enable deposition of the separated cuttings 138 directly on to a conveyor belt 140 or a mine car, not shown, for disposal, the slurry cyclone may be adapted by means of a hanger 134 for attachment to a mine roof 136.

The flow of slurry from the surge tank 12 to the slurry cyclone 18 may be monitored by diaphragm sensor 142, see FIG. 5, interconnected with the regulator 88 of the control system 78. The purpose of the diaphragm sensor is to sense the pressure of the slurry entering the slurry cyclone 18 and vary the amount of slurry transferred thereto via the regulator 88 and the variable orifice slurry valve 100, said amount of slurry being maintained within the operating limit of the slurry cyclone.

The tank means 20 is in fluid communication with the slurry cyclone 18 and the drilling device 38 via conduits indicated by the lines 148, 150 in FIGS. 1 and 5. The tank means 20 includes a tank 154 and a water pump 156 for pumping water from the tank 154 into the drilling device 38. An inlet 158 is provided to introduce make-up water into the water tank 154. The tank means 20 completes the gas-liquid-solids separation system 10 into a closed-loop system which may operate automatically and with minimal supervision at varying drilling, water and gas flow rates. It is important that a closed system be provided in order to prevent hazardous mine conditions from occurring, such as may happen with the release of methane gas and/or water and cuttings into the working area or shaft.

It is to be appreciated that any number of gas-liquid-solids separation systems may be constructed in accordance with the present invention and, although there has been described a specific system for collecting gas from subterranean formations in accordance with the present invention for the purpose of illustrating the manner in which the invention may be used to advantage, it should be appreciated that the invention is not limited thereto. Accordingly, any and all modifications, variations or equivalent methods which may occur to those skilled in the art should be considered to be within the scope of the invention as defined by the appended claims.

What is claimed is:

1. A gas-liquid-solids separation system for use with a drilling device comprising:

surge tank means for holding drilling efflux comprising gas, liquid and solids, said surge tank being adapted for mounting on said drilling device in a position for having a drill shaft extending therethrough;

a stuffing box attached to a back side of the surge tank means, configured for enabling passage of the drill shaft therethrough and including means for preventing drilling efflux to pass therethrough;

flange means attached to a front side of the surge tank means and aligned with said stuffing box for allowing passage of the drill shaft therethrough, said flange means being configured for mounting and sealing the surge tank to a borehole casing and including pipe means terminating within said surge tank means, for surrounding said drill shaft and enabling drilling efflux within the borehole to flow into the surge tank means;

gas cyclone means in fluid communication with said surge tank at a position above the liquid and solids portion of the drilling efflux within the surge tank means, for withdrawing gas from the surge tank means and separating entrained liquid therefrom;

slurry cyclone means including a slurry pump in fluid communication with said surge tank for withdrawing liquid and suspended solids therefrom and separating the solids from the liquid; and tank means, in fluid communication with the slurry cyclone means and the drilling device and including a pump, for withdrawing liquid from the slurry cyclone, storing the liquid and supplying the liquid to the drilling device for use as a cutting fluid.

2. A gas-liquid-solids separation system for use with a drilling device comprising:

surge tank means for holding drilling efflux comprising gas, liquid and solids, said surge tank being adapted for mounting on said drilling device in a position for having a drill shaft extending therethrough;

agitator means disposed, in part, in said surge tank means for causing and maintaining suspension of said solids in said liquid;

float means disposed, in part, within said surge tank means for maintaining the amount of drilling efflux in the surge tank within a preselected range;

a stuffing box attached to a back side of the surge tank means, configured for enabling passage of the drill shaft therethrough and including means for preventing drilling efflux to pass therethrough;

flange means attached to a front side of the surge tank means and aligned with said stuffing box for allowing passage of the drill shaft therethrough, said flange means being configured for mounting and sealing the surge tank to a borehole casing and including pipe means terminating within said surge tank means, for surrounding said drill shaft and enabling drilling efflux within the borehole to flow into the surge tank means;

gas cyclone means attached to said surge tank means and in fluid communication therewith at a position above the liquid and solids portion of the drilling efflux within the surge tank means, for withdrawing gas from the surge tank means and separting entrained liquid therefrom;

slurry cyclone means including a slurry pump in fluid communication with said surge tank for withdrawing liquid and suspended solids therefrom and separating the solids from the liquid; and tank means, in fluid communication with the slurry cyclone means and the drilling device and including a pump, for withdrawing liquid from the slurry cyclone, storing the liquid and supplying the liquid to the drilling device for use as a cutting fluid.

3. The gas-liquid-solids separation system of claim 2 wherein the agitator means communicates with the slurry pump for circulating the liquid and solids within the surge tank means.

4. The gas-liquid-solids separation system of claim 3 wherein the slurry pump is disposed outside of said surge tank means and interconnected therewith by a conduit system.

5. The gas-liquid-solids separation system of claim 4 further comprising control means interconnected with aid float means and the conduit system for withdrawing liquid and solids from the surge tank and transferring said liquid and solids to the slurry cyclone means in response to control signals from said float means.

6. A gas-liquid-solids separation system for use with a drilling device for boring horizontal holes in coal seams to separate methane gas and cuttings from drilling efflux comprising methane gas, water and cuttings, said gas-liquid-solids separation system comprising:

surge tank means for holding the drilling efflux, said surge tank being adapted for mounting on said drilling device in a position for having a drill shaft extending therethrough;

agitator means disposed in said surge tank means for causing and maintaining suspension of said cuttings in said water;

float means disposed, in part, within said surge tank means for maintaining the amount of drilling efflux in the surge tank within a preselected range;

a stuffing box attached to a back side of the surge tank means, configured for enabling passage of the drill shaft therethrough and including means for preventing drilling efflux to pass therethrough;

flange means attached to a front side of the surge tank means and aligned with said stuffing box for allowing passage of the drill shaft therethrough, said flange means being configured for mounting and sealing the surge tank to a borehole casing and including pipe means terminating within said surge tank means, for surrounding said drill shaft and enabling drilling efflux within the borehole to flow into the surge tank means;

gas cyclone means attached to said surge tank means and in fluid communication therewith at a position above the liquid and solids portion of the drilling efflux within the surge tank means, for withdrawing methane gas from the surge tank means and separating entrained water therefrom;

slurry cyclone means including a slurry pump, in fluid communication with said surge tank for withdrawing water and suspended cuttings therefrom and separating the cuttings from the water; and tank means, in fluid communication with the slurry cyclone means and the drilling device and including pump, for withdrawing water from the slurry cyclone, storing the water and supplying the water to the drilling device for use as a cutting fluid.

7. The gas-liquid-solids separation system of claim 6 wherein the agitator means communicate with the slurry pump for circulating the water and cuttings within the surge tank means.

8. The gas-liquid-solids separation system of claim 7 wherein the slurry pump is disposed outside of said surge tank means and interconnected therewith by a conduit system.

9. The gas-liquid-solids separation system of claim 8 further comprising control means interconnected with said float means and the conduit system for withdrawing water and cuttings from the surge tank and transferring said water and cuttings to the slurry cyclone means in response to control signals from said float means.

10. A gas-liquid-solids separation system for use with a drilling device for boring horizontal holes in coal seams to separate methane gas and cuttings from drilling efflux comprising methane gas, water and cuttings, said gas-liquid-solids separation system comprising:

surge tank means for holding the drilling efflux, said surge tank being adapted for mounting on said drilling device in a position for having a drill shaft extending therethrough;

agitator means disposed, in part, in said surge tank means for causing and maintaining suspension of said cuttings in said water, said agitator means including a slurry pump for circulating the water and cuttings within the surge tank means, said slurry pump being disposed outside the surge tank means and interconnected therewith by a conduit system;

float means disposed, in part, within said surge tank means for maintaining the amount of drilling efflux in the surge tank within a preselected range;

a stuffing box attached to a back side of the surge tank means, configured for enabling passage of the drill shaft therethrough and including means for preventing drilling efflux to pass therethrough;

flange means attached to a front side of the surge tank means and aligned with said stuffing box for allowing passage of the drill shaft therethrough, said flange means being configured for mounting and sealing the surge tank to a borehole casing and including pipe means terminating within said surge tank means, for surrounding said drill shaft and enabling drilling efflux within the borehole to flow into the surge tank means;

gas cyclone means attached to said surge tank means and in fluid communication therewith at a position above the liquid and solids portion of the drilling efflux within the surge tank means, for withdrawing methane gas from the surge tank means and separating entrained water therefrom;

slurry cyclone means including a slurry pump, in fluid communication with said surge tank for withdrawing water and suspended cuttings therefrom and separating the cuttings from the water;

control means interconnected with said float means and the conduit system for enabling water and cuttings to be withdrawn from the surge tank and transferred to the slurry cyclone means in response to control signals from said float means; and, tank means, in fluid communication with the slurry cyclone means and the drilling device and including pump, for withdrawing water from the slurry cyclone, storing the water and supplying the water to the drilling device for use as a cutting fluid.

* * * * *